(12) United States Patent  (10) Patent No.: US 7,551,243 B2
Cernasov  (45) Date of Patent: Jun. 23, 2009

(54) LENS FOR INCREASED LIGHT DISTRIBUTION UNIFORMITY IN AN LCD BACKLIGHT

(75) Inventor: Andrei Cernasov, Ringwood, NJ (US)

(73) Assignee: Honeywell International Inc., Morristown, NJ (US)

( * ) Notice: Subject to any disclaimer, the term of this patent is extended or adjusted under 35 U.S.C. 154(b) by 296 days.

(21) Appl. No.: 11/602,331

(22) Filed: Nov. 21, 2006

(65) Prior Publication Data

US 2008/0117360 A1    May 22, 2008

(51) Int. Cl.
  *G02F 1/13357*   (2006.01)
  *F21V 8/00*   (2006.01)
(52) U.S. Cl. ................. 349/65; 385/146; 362/612; 362/615
(58) Field of Classification Search ................. None
  See application file for complete search history.

(56) References Cited

U.S. PATENT DOCUMENTS

| | | | | |
|---|---|---|---|---|
| 5,197,792 | A * | 3/1993 | Jiao et al. | 362/623 |
| 5,550,676 | A * | 8/1996 | Ohe et al. | 359/599 |
| 6,123,431 | A | 9/2000 | Teragaki et al. | |
| 6,124,906 | A | 9/2000 | Kawada et al. | |
| 6,447,136 | B1 | 9/2002 | Liu et al. | |
| 6,473,554 | B1 * | 10/2002 | Pelka et al. | 385/146 |
| 6,538,710 | B1 | 3/2003 | Jang | |
| 6,608,614 | B1 | 8/2003 | Johnson | |
| 6,609,808 | B2 | 8/2003 | Chen | |
| 6,612,722 | B2 | 9/2003 | Ryu et al. | |
| 6,667,782 | B1 | 12/2003 | Taira et al. | |
| 6,690,435 | B1 | 2/2004 | Ha et al. | |
| 6,867,828 | B2 | 3/2005 | Taira et al. | |
| 6,883,925 | B2 | 4/2005 | Leu et al. | |
| 2004/0076010 | A1 * | 4/2004 | Kuo | 362/332 |
| 2004/0207999 | A1 | 10/2004 | Suehiro et al. | |
| 2005/0068777 | A1 * | 3/2005 | Popovic | 362/307 |
| 2005/0140849 | A1 * | 6/2005 | Hoelen et al. | 349/65 |
| 2006/0238873 | A1 * | 10/2006 | Park et al. | 359/600 |
| 2007/0153546 | A1 * | 7/2007 | Wu | 362/612 |
| 2007/0189701 | A1 * | 8/2007 | Chakmakjian et al. | 385/146 |

FOREIGN PATENT DOCUMENTS

| | | |
|---|---|---|
| EP | 1701389 A1 | 9/2006 |
| EP | 1715366 A2 | 10/2006 |
| JP | 10276298 | 10/1998 |

OTHER PUBLICATIONS

PCT Search Report, PCT/US2007/085051 dated May 30, 2008.

* cited by examiner

*Primary Examiner*—Sung H Pak
*Assistant Examiner*—Mike Stahl
(74) *Attorney, Agent, or Firm*—Ingrassia Fisher & Lorenz, P.C.

(57) ABSTRACT

A lens for use in a lighting arrangement, such as an LCD backlight, includes a light guiding region and a lens surface. The light guiding region is shaped to focus light from a light source toward a region of the lens located on its periphery. The lens surface has reflection regions for reflecting light from the light source back into the lens and transmission regions for transmitting light from the light source outside the lens. A characteristic of the transmissions regions, such as width, varies as a function of the location of the light source so as to create substantially uniform average light distribution for areas of the lens positioned at various distances with respect to the light source.

17 Claims, 10 Drawing Sheets

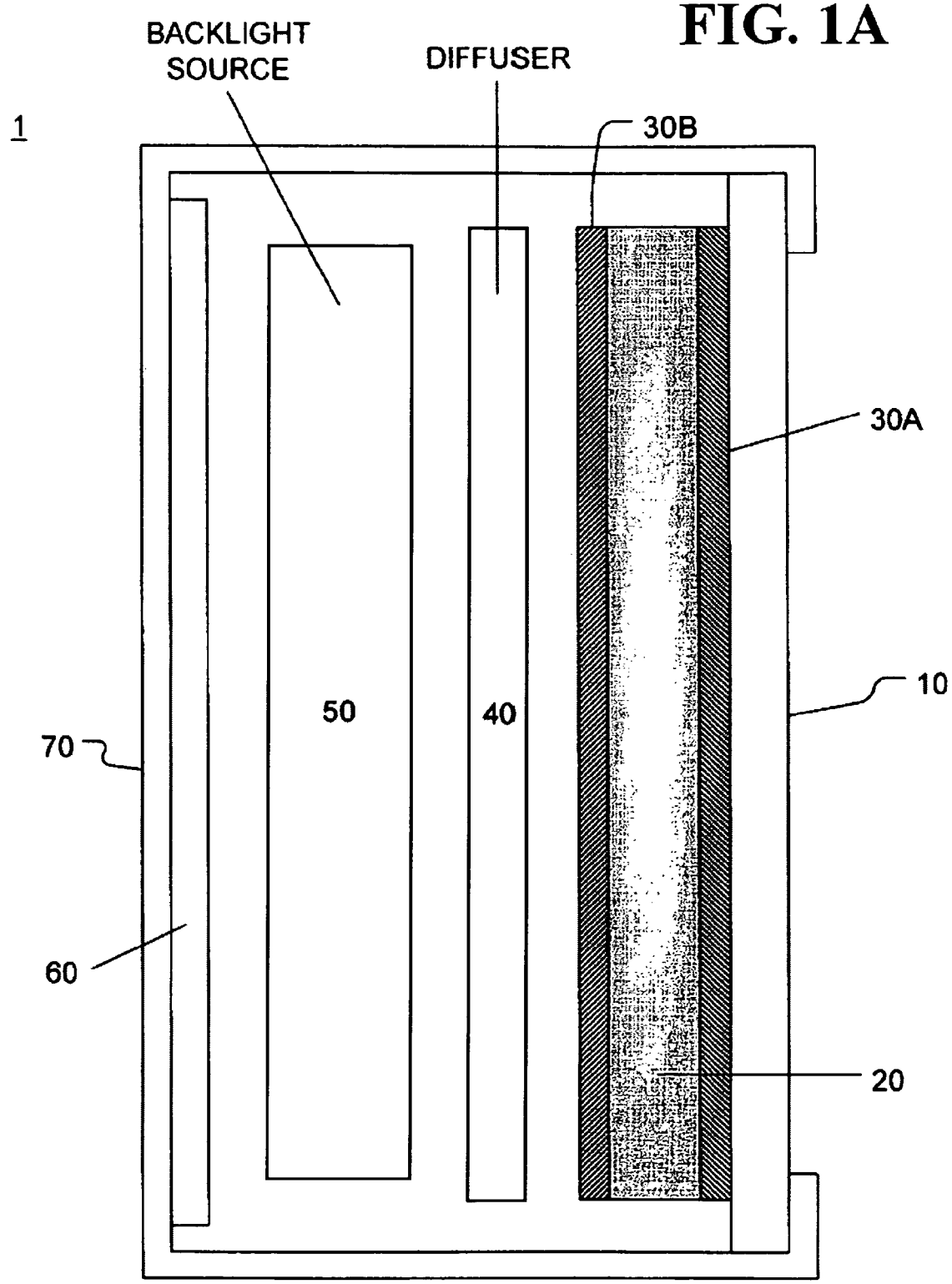

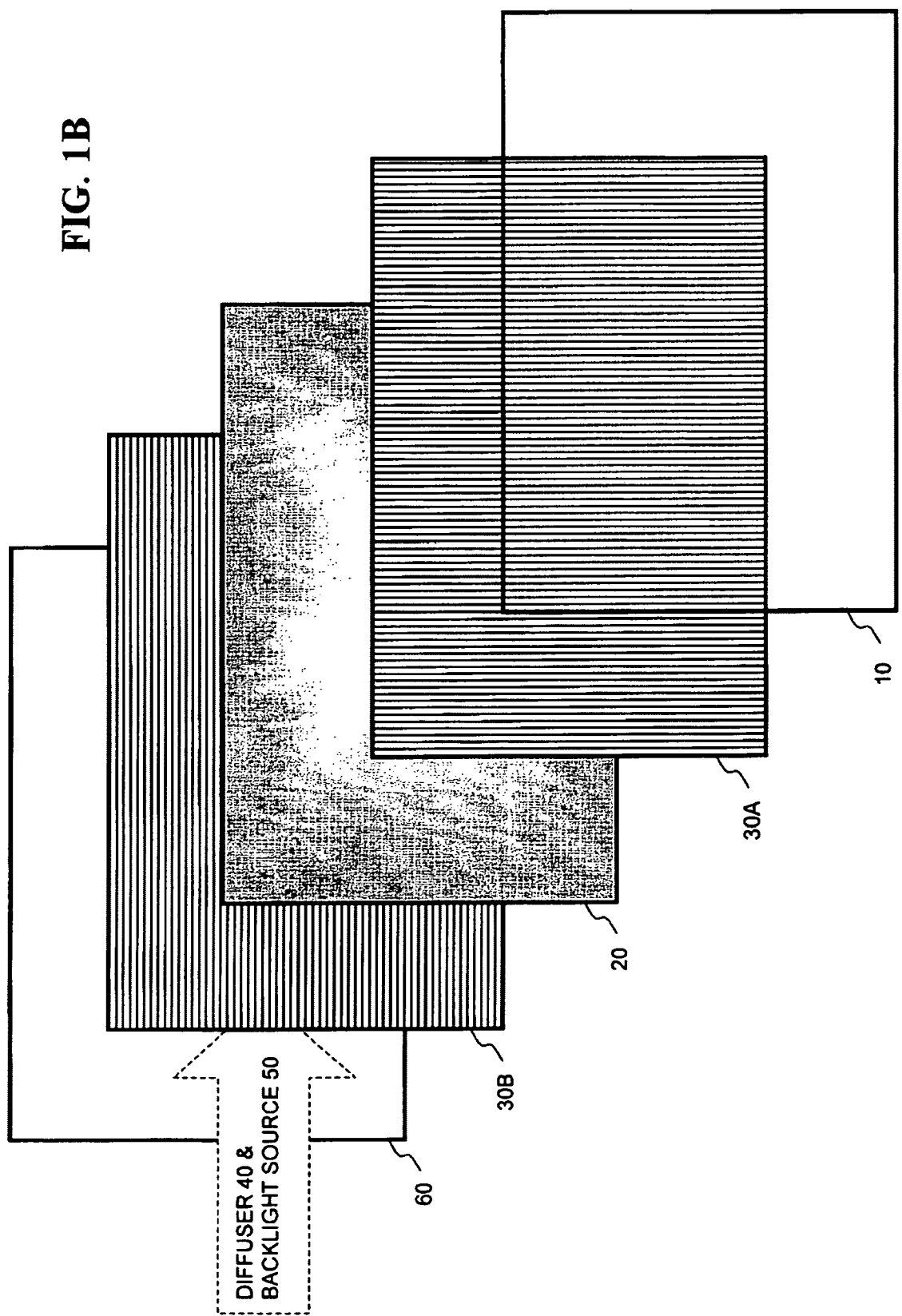

FIG. 4A  Top View
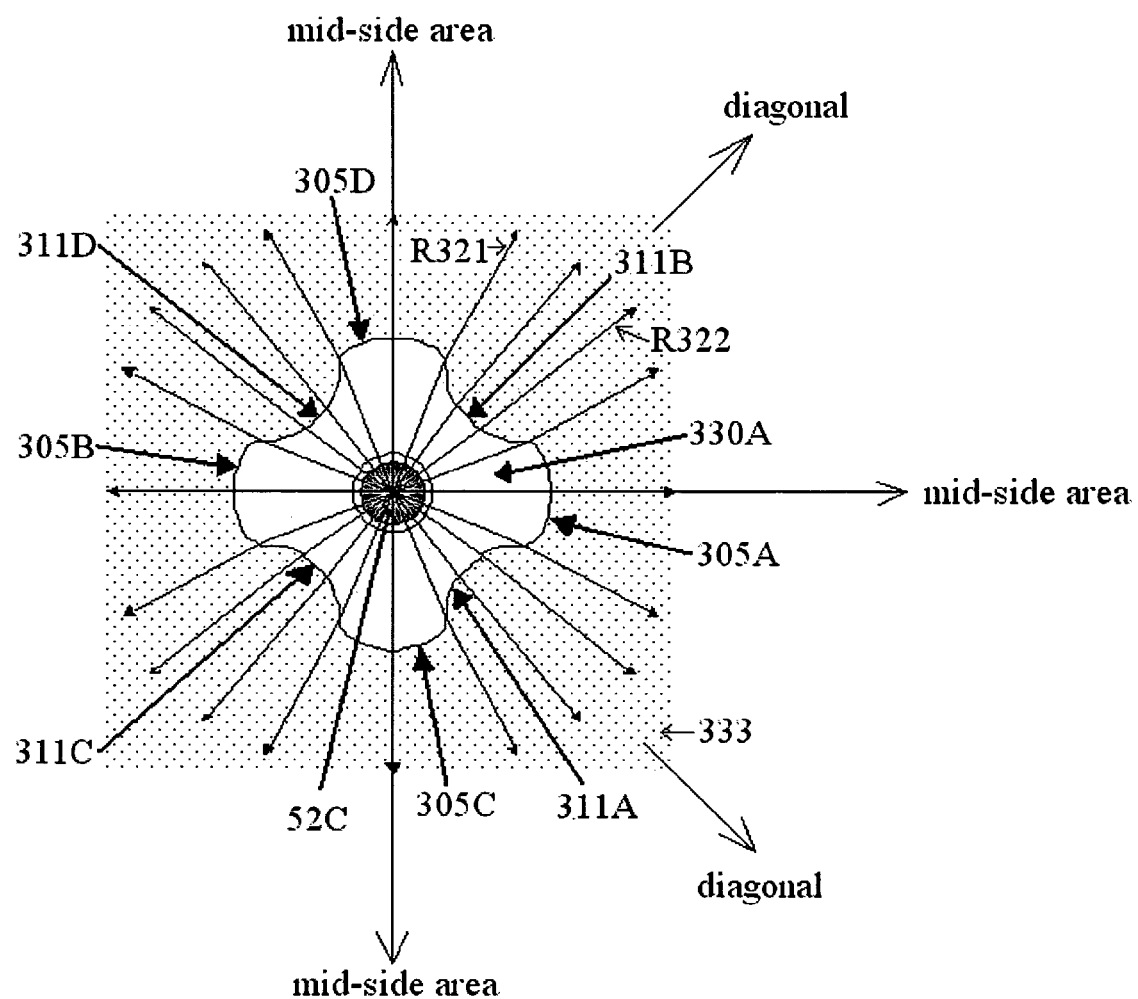

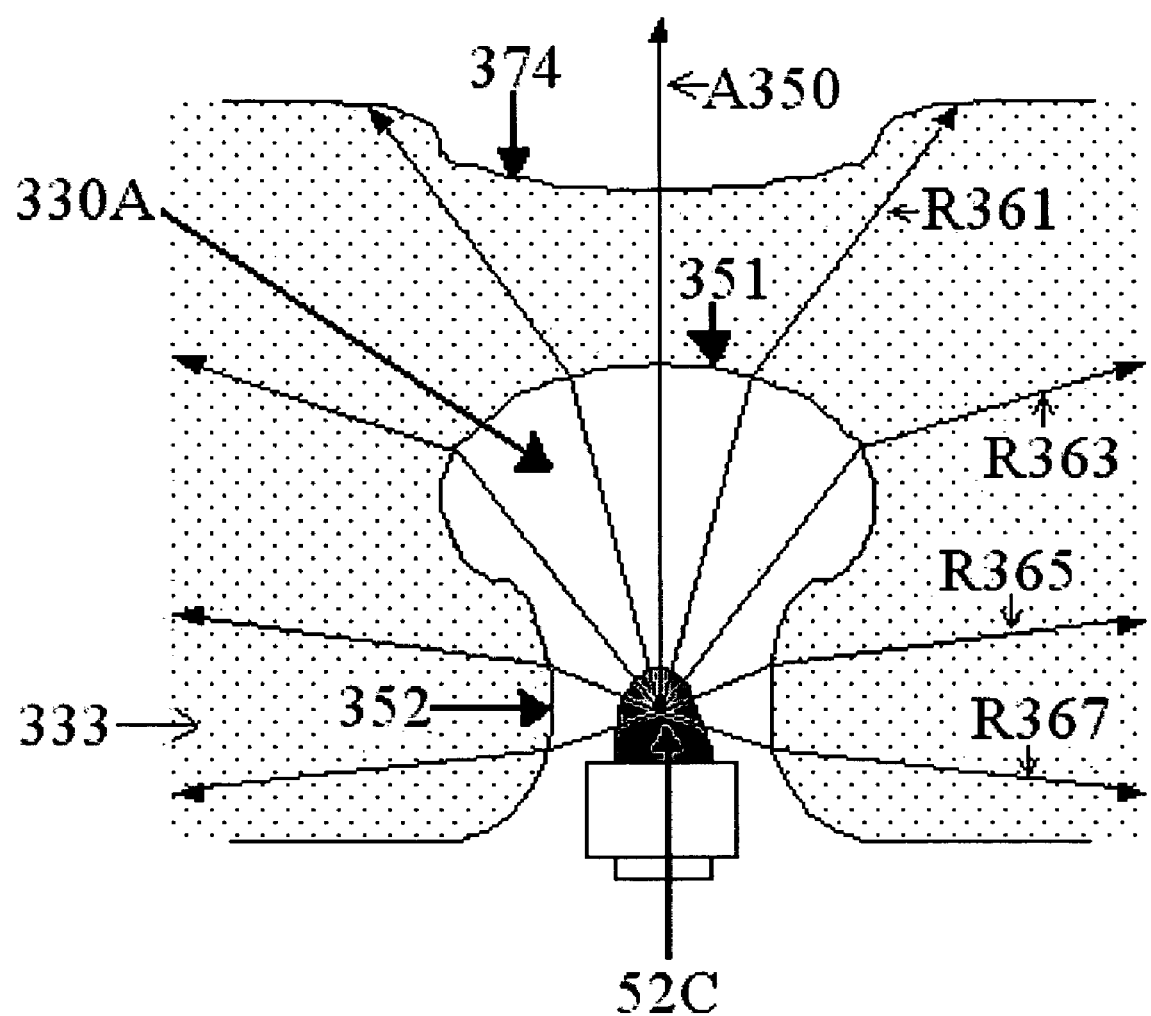
FIG. 4B  Cross-Sectional View

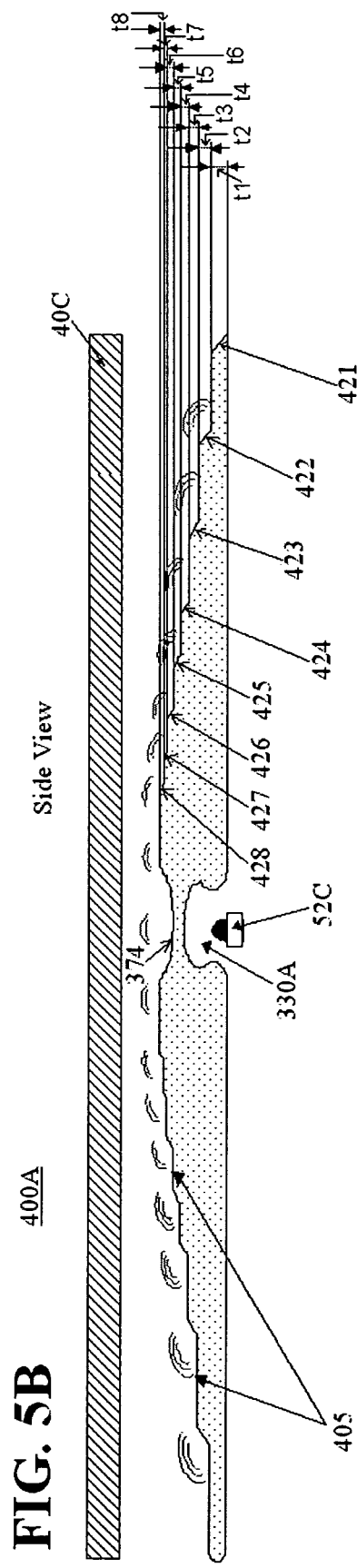

LENS FOR INCREASED LIGHT DISTRIBUTION UNIFORMITY IN AN LCD BACKLIGHT

BACKGROUND OF THE INVENTION

1. Field of the Invention

The present invention relates to a backlight for a liquid crystal display (LCD), and more particularly, to a lens configuration for increased light distribution uniformity in an LCD backlight.

2. Description of the Related Art

The active parts of liquid crystal display (LCD) panels, such as polarizers, liquid crystal layers, indium tin oxide electrodes, supports, etc., are relatively thin. However, standard designs for direct or edge-lit backlight assemblies for LCDs are bulky, and need to be custom designed for each LCD panel size. In fact, most of the physical volume of a typical/conventional backlit LCD panel is occupied by the backlight assembly itself.

The reason for the bulkiness of the backlight assembly is the space required for light originating at a few discrete points in the assembly, to be thoroughly randomized, or diffused, so that the liquid crystal (LC) layer is illuminated by a uniformly distributed flux of light. Due to surface size constraints, only a small number of LEDs can be used for backlighting systems. The LEDs need to illuminate an entire LCD. A bulky diffuser is thus required to make the intensity of the light from the small number of LEDs uniform across the LC screen.

The number of LEDs used for backlighting LCD systems may be increased. However, a larger number of LEDs leads to higher cost, increased energy consumption, and poses reliability problems. Moreover, regardless how many LEDs are used, each LED creates a highly non-uniform local lighting profile, as the intensity of light generated by an LED decreases as a function of distance from the LED.

Disclosed embodiments of this application address these and other issues by utilizing lens that are configured to increase uniformity of light distribution in an LCD backlight arrangement.

SUMMARY OF THE INVENTION

In one aspect, the present invention is directed to a lens for use in a lighting arrangement. The lens comprises: a light guiding region, which is shaped to direct light from a light source toward a region of the lens located on the periphery of the lens; and a lens surface, the lens surface having reflection regions for reflecting light from the light source back into the lens and transmission regions for transmitting light from the light source outside the lens. A characteristic of the transmissions regions varies as a function of the location of the light source so as to create substantially uniform average light distribution for areas of the lens positioned at various distances with respect to the light source.

According to another aspect, the present invention is an LCD backlight comprising a plurality of lenses arranged in a pattern. Each lens includes: a light guiding region, which is shaped to direct light from a light source toward a region of the lens located on the periphery of the lens; and a lens surface, the lens surface having reflection regions for reflecting light from the light source back into the lens and transmission regions for transmitting light from the light source outside the lens. A characteristic of the transmission regions varies as a function of location of the light source so as to create substantially uniform average light distribution for areas of the lens positioned at various distances with respect to the light source.

BRIEF DESCRIPTION OF THE DRAWINGS

Further aspects and advantages of the present invention will become apparent upon reading the following detailed description in conjunction with the accompanying drawings. These drawings do not limit the scope of the present invention. In these drawings, similar elements are referred to using similar reference numbers, wherein:

FIGS. 1A and 1B illustrate the configuration of a typical liquid crystal display (LCD) device;

FIG. 4A illustrates a top view of a configuration for a light source cavity, for use in a lens for LCD backlights according to an embodiment of the present invention;

FIG. 4B illustrates a cross-section of the light source cavity illustrated in FIG. 4A, for use in a lens for LCD backlights according to an embodiment of the present invention;

FIG. 5B illustrates a cross-sectional side view for the lens for LCD backlights illustrated in FIG. 5A, according to an embodiment of the present invention;

DETAILED DESCRIPTION

Figure 2:
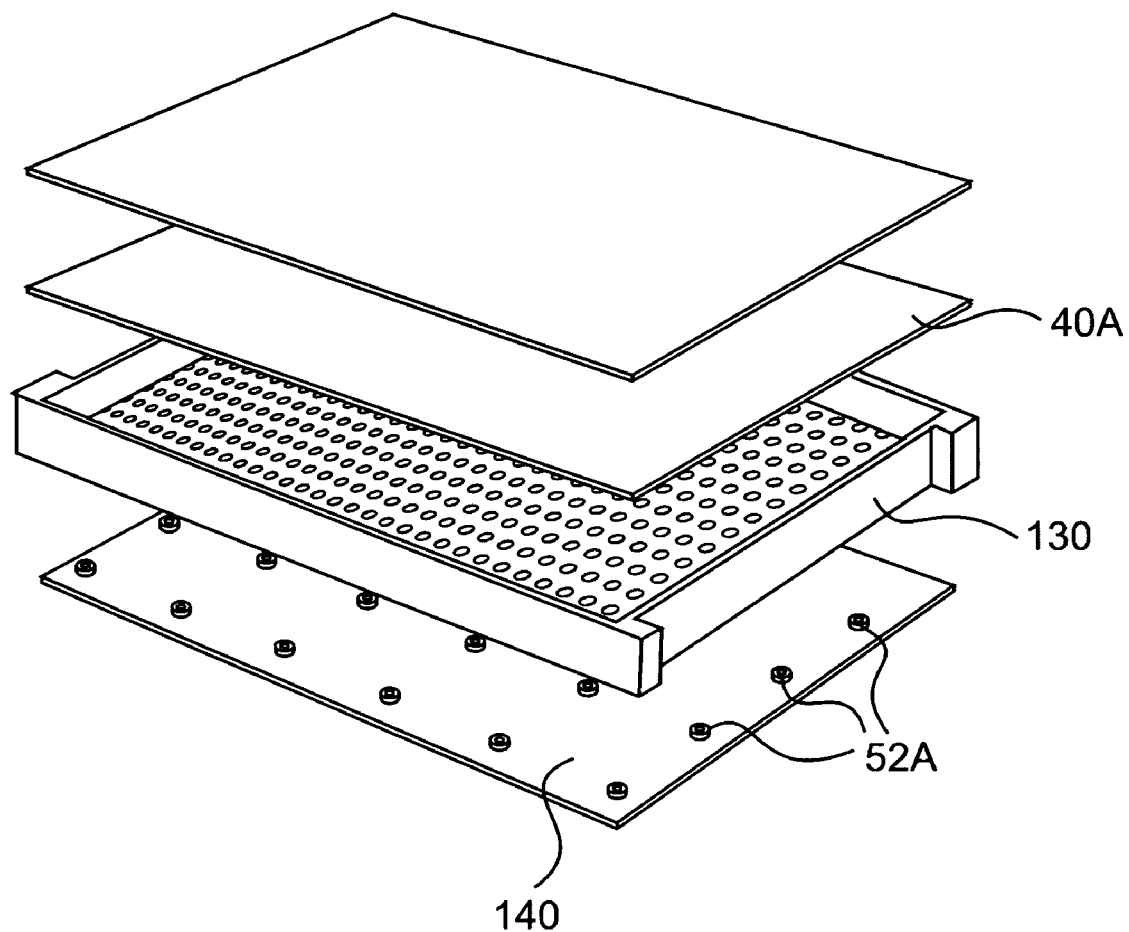
FIG. 2 illustrates a direct backlight illumination arrangement for typical backlit LCD devices.

Aspects of the invention are more specifically set forth in the accompanying description with reference to the appended figures. FIGS. 1A and 1B illustrate the configuration of a typical liquid crystal display (LCD) device with backlighting.

As shown in FIG. 1A, a typical LCD device 1 includes a liquid crystal (LC) layer 20 sandwiched between two polarizing filters 30A and 30B (hereafter "polarizers"). The LC layer is protected by a transparent front protective sheet 10, e.g., a glass plate. Behind the LC and polarizing layers are a light diffusing film 40 (hereafter "diffuser"), a backlight source 50, and a reflective surface 60. A casing or enclosure 70 is provided to hold the aforementioned layers in place. FIG. 1B illustrates an exploded view of the stack of LCD layers described above. The specification may collectively refer to these layers as the "LCD stack" of a backlit LCD device (including diffuser 40 and backlight source 50).

In a typical backlit LCD device (also referred to as a "transmissive" LCD device), the backlight is emitted directly from source 50 and reflected from reflective surface 60 to the diffuser 40. The diffuser 40 diffuses this light to make the intensity or brightness more uniform across the LCD. Polarizers 30A and 30B are cross-polarized with respect to each other.

Thus, the backlight polarized by polarizer 30B must be rotated to some extent by LC layer 20 in order to pass through polarizer 30A. The degree to which the LC layer 20 rotates the light is dependent upon the amount of voltage applied across the various liquid crystal molecules in the LC layer 20. For instance, a pair of electrodes (not shown) may be positioned across each LC cell to apply an appropriate voltage to "twist" the corresponding LC molecules, thereby rotating the backlight to pass through.

FIG. 2 illustrates a direct backlight illumination scheme for typical backlit LCD devices. In a direct backlight scheme as illustrated in FIG. 2, a sufficiently thick spacer box 130 is needed between the LED PCB 140 and the diffuser 40A. The LED PCB 140 supports LEDs 52A. The spacer box 130 and the diffuser 40A are used to randomize the light originating at LEDs 52A, and create a uniformly distributed flux.

Figure 3:
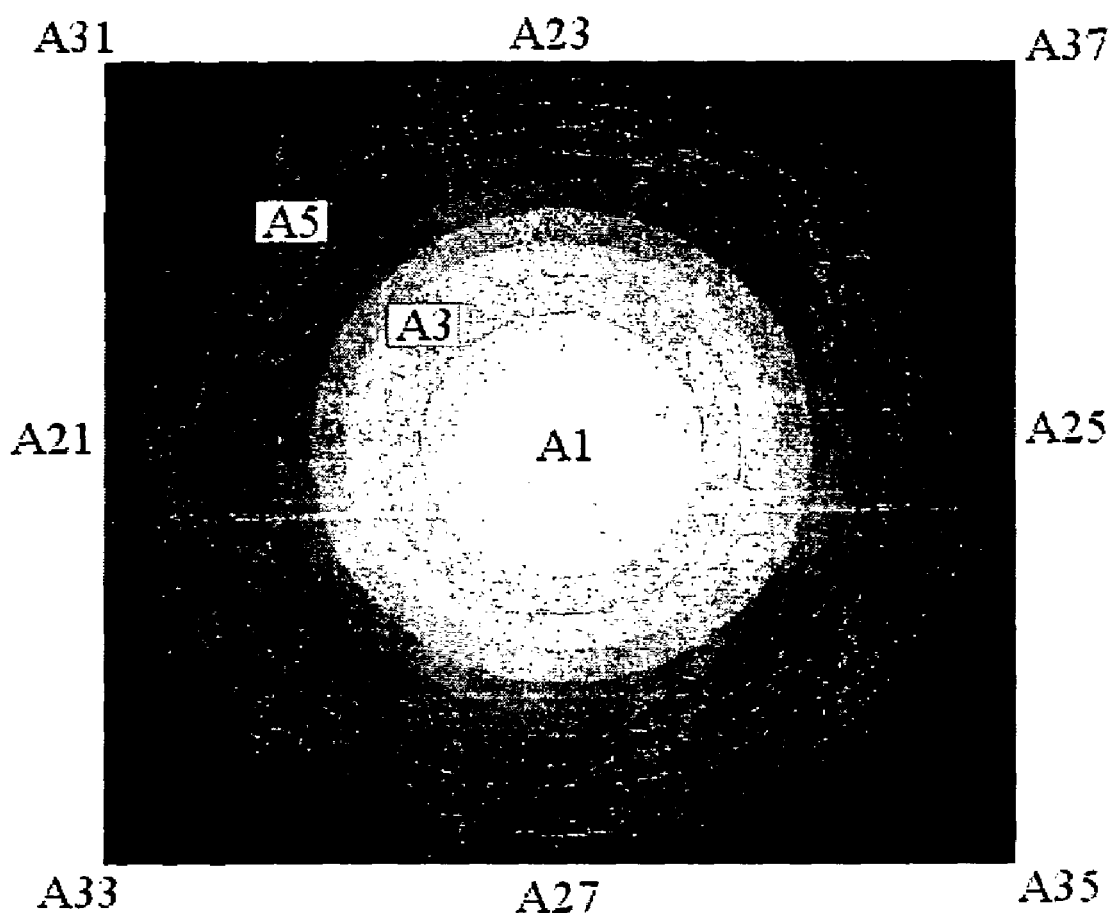
FIG. 3 illustrates the light distribution of a pinpoint source in a rectangular tile used in typical backlit LCD devices.

FIG. 3 illustrates the light distribution of a pinpoint source in a rectangular tile used in typical backlit LCD devices. Important characteristics for good quality backlights are uniform light output distribution and a low profile. However, achieving a uniform light output distribution and a low profile using a discrete set of pinpoint sources, such as LEDs, is difficult. The difficulty arises from the fact that the intensity of the light generated by a pinpoint source decreases as a function of the distance from the source. As illustrated in FIG. 3, the intensity of the light from a pinpoint source A1 is smaller at point A5 than at point A3, as point A5 is further out from source A1 than point A3.

This pinpoint source behavior causes two problems. First, even if a diffuser is used, the light output is considerably stronger closer to a pinpoint source than further away from the pinpoint source. Secondly, if a backlight is built from elementary (for example, rectangular) tiles, the intensity of light at the vertices of the tiles is lower than at the mid-sides, even if perfect diffusers are used with the rectangular tiles. For example, for a tile 210 as illustrated in FIG. 3, with point source A1 located at the center of the tile, the intensity of light at the tile vertices A31, A33, A35, and A37, is lower than the intensity of light at the tile mid-sides A21, A23, A25, and A27.

FIG. 4A illustrates a top view of a configuration for a light source cavity 330A, for use in a lens for LCD backlights according to an embodiment of the present invention. In FIG. 4A, rectangular region 333 is a portion of a lens. Light source 52C may be an LED light source, or any other type of light source that can be used for LCD or other electronic and optical applications.

As explained with reference to FIG. 3, for a tile using a center light source, the intensity of light at the vertices of the tile is typically lower than at the mid-sides. Light source cavity 330A is designed to compensate for light intensity along the diagonals (tile vertices), so that the difference in light intensity between diagonals and mid-sides is minimized. The light source cavity 330A illustrated in FIG. 4A is shaped so as to divert some of the light from the mid-side areas towards the diagonal areas.

A top view for the shape of light source cavity 330A of the lens is shown in FIG. 4A. The cross-sectional top view shows that the wall of the light source cavity 330A forms four convex lenses interleaved with four concave lenses. The concave lenses are 305A, 305B, 305C and 305D, and the convex lenses are 311A, 311B, 311C and 311D. By shaping the light source cavity 330A to have convex and concave parts, portions with positive and negative optical powers are obtained. The convex portions are facing the corners of the rectangular region 333, while the concave portions are facing the centers of the sides. Convex portions make rays converge, rather than diverge. The convex lenses loosely focus the light towards the corners of the tile (towards the diagonals), while the four concave lenses diverge the light away from the mid-sides. For example, ray R322 is directed towards a corner of the tile (a vertex at a diagonal), while ray R321 is directed away from a mid-side. This shape for the light source cavity 330A addresses the problem that the corners of a tile are not as bright as the tile mid-sides. Hence, the light source cavity 330A shape in FIG. 4A compensates for the light intensity rotational asymmetry associated with rectangular tiles.

FIG. 4B illustrates the cross-section for the light source cavity 330A illustrated in FIG. 4A, for use in a lens for LCD backlights according to an embodiment of the present invention. As illustrated in FIG. 4B, the top of the light source cavity 330A comprises a concave lens segment 351, which spreads the light sideways, away from the center axis A350 of the light source 52C. For example, rays R361 and R363 are directed away from the center axis A350 of the light source 52C. Hence, the configuration of the inner surface of the light source cavity 330A causes light from light source 52C to spread more uniformly. Surface 352 is a convex lens, which makes rays converge. The shape of the light source cavity 330A also depends on the characteristics of the LED light source present at the center of the light source cavity.

Figure 5A:
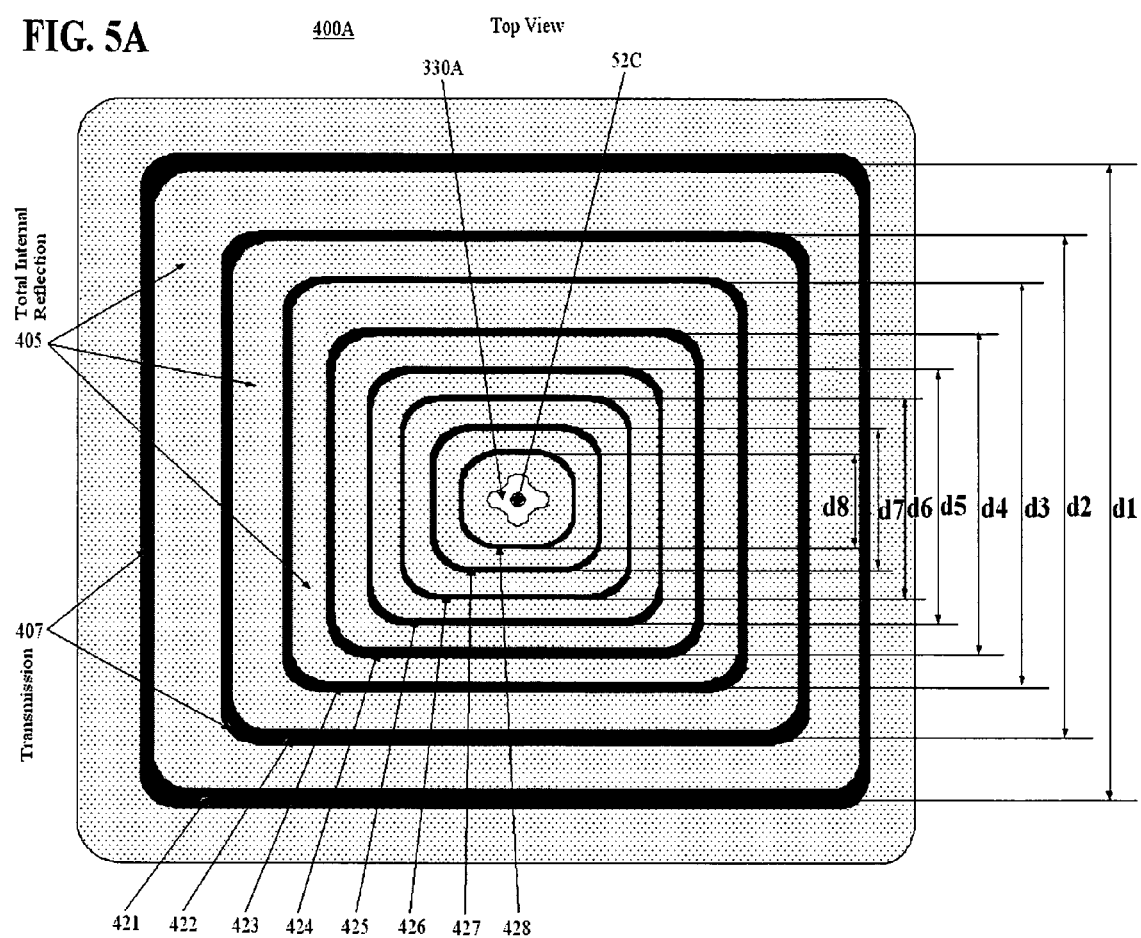
FIG. 5A illustrates a top view for a lens for LCD backlights according to an embodiment of the present invention.

FIG. 5A illustrates a top view of a lens 400A for LCD backlights according to an embodiment of the present invention. FIG. 5B illustrates a cross-sectional side view for the lens 400A for LCD backlights illustrated in FIG. 5A, according to an embodiment of the present invention. The rectangular lens 400A is a rectangular tile, whereby a plurality of tiles can be included in an LCD backlight assembly. A light source cavity 330A, as described at FIGS. 4A and 4B, is located in the center of lens 400A. A light source 52C is located at the center of light source cavity 330A.

The lens 400A improves uniformity of light distribution for light from source 52C. The lens cross-section is profiled so that lens 400A has sections where most of the light is bounced back into the lens 400A, through reflection, partial reflection, or total internal reflection. These sections are the reflection areas 405 as shown in FIG. 5A. The index of refraction of the lens material of lens 400A may be designed to achieve total internal reflection. A high index of refraction, which is constant across the lens 400A, may be used for this purpose. In one embodiment, the lens 400A is made of a plastic material, which reduces lens fabrication costs.

Additionally, transmission channels 407 are created at positions selected to insure uniform average distribution of light. The transmission channels 407 in this embodiment are created by locally slanting the profile of the lens 400A, so that the total internal reflection condition is no longer met. The step-down channel profile is illustrated in FIG. 5B, where the slants 421, 422, 423, 424, 425, 426, 427, and 428 are the light transmission channels 407 for the lens 400A.

Alternating channels may be carved into an otherwise flat profile of lens 400A. The openings of the slants (or widths) for the channels 407 are smaller close to the centrally located source 52C, and get larger farther away from the center 52C. In one embodiment, for $d_1, d_2, d_3, \ldots, d_n$ channel lengths for n channels 407, and $t_1, t_2, t_3, \ldots, t_n$ channel widths (slants) for the same n channels 407, equations (1), (2), . . . , (n) are satisfied:

$$\frac{t_1}{t_2} = \frac{d_1}{d_2} e^{A(d_1 - d_2)} \qquad \text{Eq. 1}$$

$$\frac{t_2}{t_3} = \frac{d_2}{d_3} e^{A(d_2 - d_3)} \qquad \text{Eq. 2}$$

$$\frac{t_3}{t_4} = \frac{d_3}{d_4} e^{A(d_3 - d_4)} \qquad \text{Eq. 3}$$

-continued $$\frac{t_4}{t_5} = \frac{d_4}{d_5} e^{A(d_4-d_5)} \quad \text{Eq. 4}$$

$$\ldots$$

$$\frac{t_{n-2}}{t_{n-1}} = \frac{d_{n-2}}{d_{n-1}} e^{A(d_{n-2}-d_{n-1})} \quad \text{Eq. n-1}$$

$$\frac{t_{n-1}}{t_n} = \frac{d_{n-1}}{d_n} e^{A(d_{n-1}-d_n)} \quad \text{Eq. n}$$

where A is a constant depending on the geometry of the lens (shape, size, number and spacing of channels, etc.). If the size of the openings ($t_1, t_2, t_3, \ldots, t_n$) increases as a function of the distance from the center 52C ($d_1/2, d_2/2, d_3/2, \ldots, d_n/2$) in this manner, then the variation of light intensity with distance from the center 52C is compensated for. This happens because the inner openings (channels) are brighter but narrower than the outer openings (channels), hence the light intensities from inner and outer channels are equal. Although eight transmission channels are shown for lens 400A, more or less transmission channels 407 may be used, depending on the desired average light intensity from lens 400A.

Although a diffuser may still be used, the overall backlight may be much thinner, since a typical diffuser needs to be located at a distance comparable with the spacing of the light sources, for good light uniformity. The spacing of the light sources is the distance between light source 52C and a next adjacent light source (not shown). Since the spacing between slant opening or channels 407 is much smaller than the spacing between light sources, the diffuser may be positioned closer to the arrangement of lenses 400.

To minimize the difference in light intensity between tile diagonals and tile mid-sides for rectangular tiles, some light may be diverted from the mid-side areas towards the diagonal areas of the tile by using the light source cavity 330A described at FIGS. 4A and 4B. By placing the light source cavity 330A inside lens 400A and inserting the light source 52C in the cavity 330A, a space saving effect is achieved.

In alternative embodiments of the current invention, the surface of the lens used for LCD backlights can have other geometries that improve uniformity of light distribution from a central source. For example, transmission areas on the lens surface can have other shapes besides the concentric rectangular shapes shown in FIG. 5A. Transmission areas on the lens surface can also be created using "tap points," or openings in the lens surface, at a variety of locations. Imperfections or other features on the lens surface can be shaped and arranged so that the ratio between the transmitted light and the internally reflected light is changed and controlled as desired.

In one embodiment of the present invention, lens 400 is configured so that most of the light is bounced back into the lens by mirrored (total reflection) sections 405 on the lens surface. Additionally, transmission channels 407 are created at positions selected to insure uniform average distribution of light. In this embodiment, the transmission channels 407 are created by removing mirror portions from the top surface of the lens 400. Hence, light transmission channels 407 correspond to absence of mirror surfaces, while reflection areas 405 correspond to mirror regions. This design may be achieved by covering the lens surface with a mirror, and then carving out mirror portions to obtain transmission channels 407.

Figure 6:
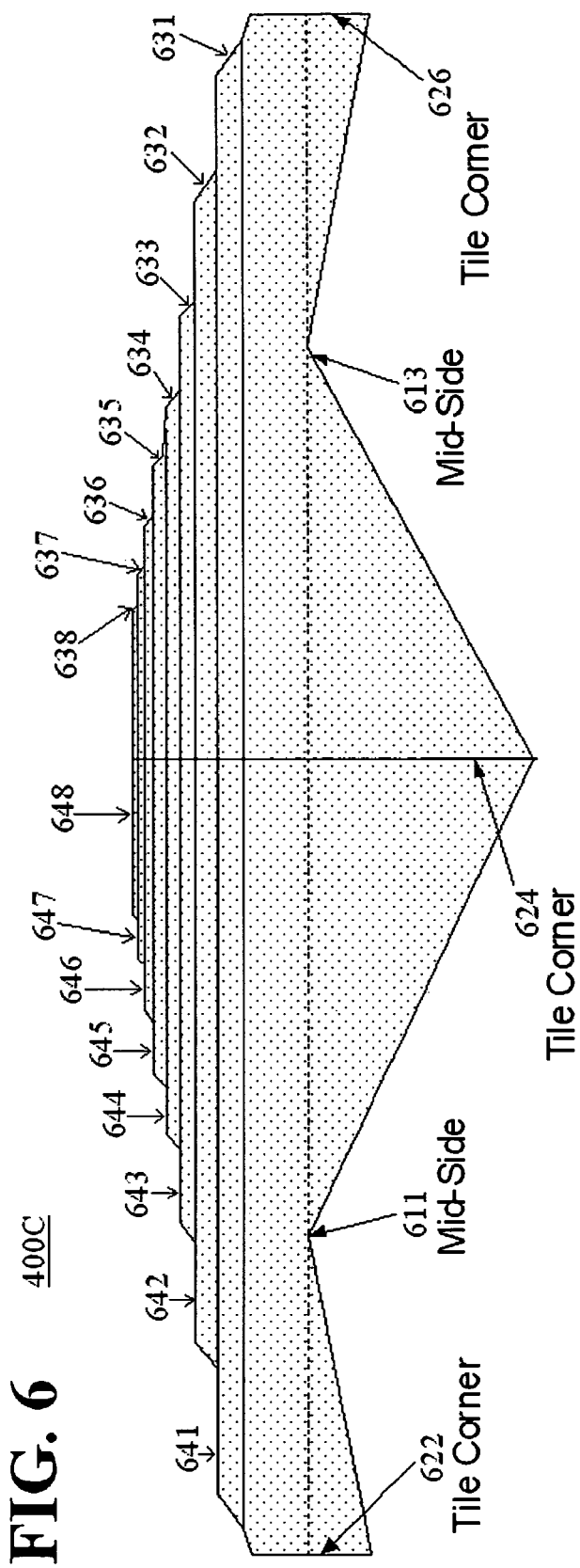
FIG. 6 illustrates a rectangular lens for LCD backlights, according to an another embodiment of the present invention.

FIG. 6 illustrates a rectangular lens 400C for LCD backlights, according to another embodiment of the present invention. The lens 400C is designed with an alternative configuration to that illustrated in FIGS. 4A and 4B to minimize the difference in light intensity between diagonals and mid-sides of rectangular tiles, and achieve light uniformity for a rectangular tile. As illustrated in FIG. 6, the lens 400C is designed to be thinner at mid-sides (such as at points 611 and 613) and thicker along the diagonals, or tile corners (such as at points 622, 624, and 626). An LED is placed in the middle of the lens 400C. The top surface of lens 400C may have a stepped profile, as illustrated in FIGS. 5A, 5B to obtain transmission channels and total internal reflection areas.

Figure 7:
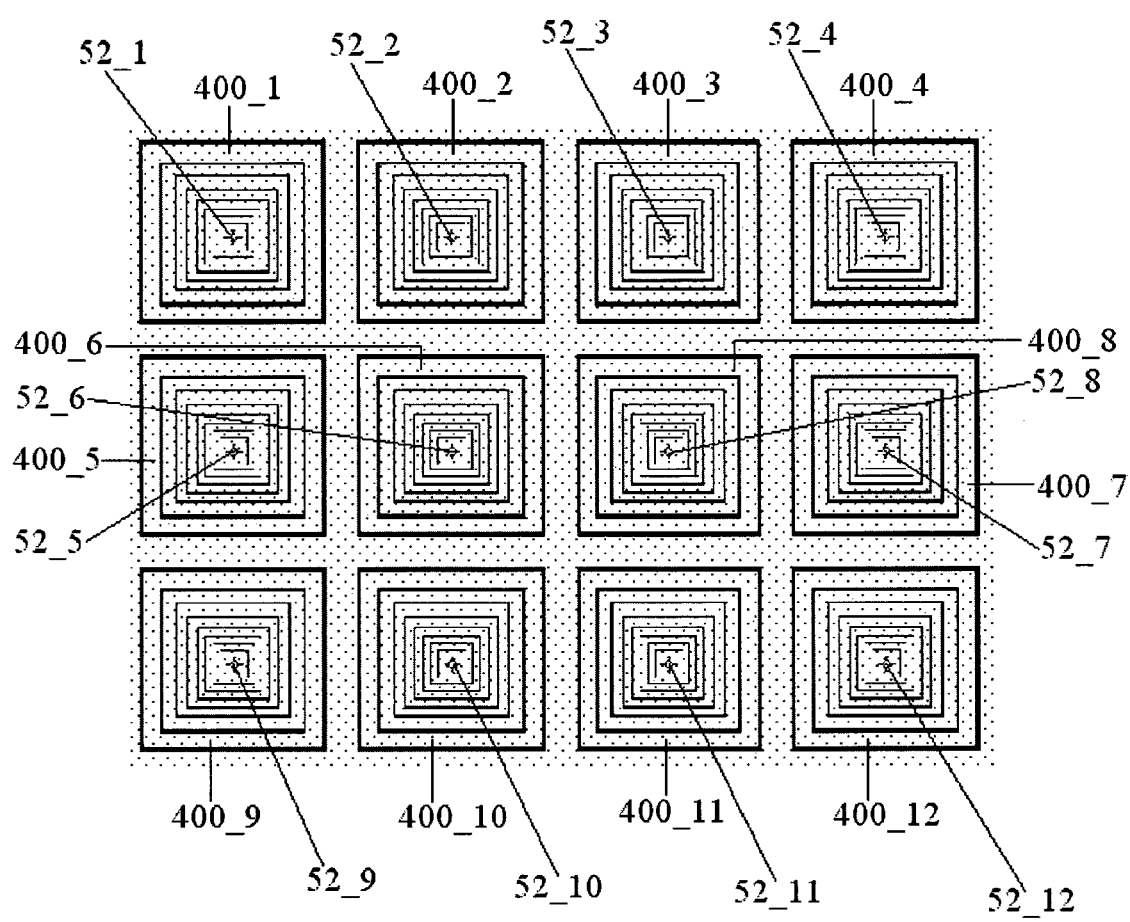
FIG. 7 illustrates a tile matrix arrangement of lenses for LCD backlights, according to an embodiment of the present invention.

FIG. 7 illustrates a tile matrix arrangement 800 of lenses for LCD backlights, according to an embodiment of the present invention. The tile matrix arrangement 800 includes lenses 400_1, 400_2, 400_3, 400_4, 400_5, 400_6, 400_7, 400_8, 400_9, 400_10, 400_11, and 400_12. Lenses 400_1, 400_2, 400_3, 400_4, 400_5, 400_6, 400_7, 400_8, 400_9, 400_10, 400_11, and 400_12 may be designed according to embodiments of the present invention described above with reference to FIGS. 5A, 5B, and 6. LED sources 52_1, 52_2, 52_3, 52_4, 52_5, 52_6, 52_7, 52_8, 52_9, 52_10, 52_11, and 52_12 are present at the center of lenses 400_1, 400_2, 400_3, 400_4, 400_5, 400_6, 400_7, 400_8, 400_9, 400_10, 400_11, and 400_12. LCD backlights can be built from such LED driven thin rectangular tiles. Different numbers of such tiles can be used for various size panels. A lens for LCD backlights according to this invention can have other shapes rather than squares for which a tessellated pattern is obtained using the lenses.

The apparatuses described in this application implement thin and stackable lenses that are configured to increase uniformity of light distribution. A single piece lens may incorporate all the light guiding surfaces required for uniform distribution of light from a pinpoint source. Multiple lenses may be embedded in a single sheet, or may be stacked, to create backlights of any size.

Although detailed embodiments and implementations of the present invention have been described above, it should be apparent that various modifications are possible without departing from the spirit and scope of the present invention. For example, although aspects of the present invention have been described in the context of LCD backlights, it should be realized that the principles of the present invention may be applicable to other optical and electronic systems.

I claim:

1. A lens for use in a lighting arrangement, said lens comprising:
    a light guiding region, said light guiding region being shaped to direct light from a light source toward a region of said lens located on the periphery of said lens;
    a lens surface, said lens surface having reflection regions for reflecting light from said light source back into said lens and transmission channels for transmitting light from said light source outside said lens, a characteristic of said transmission channels varying as a function of the distance from the location of said light source so as to create substantially uniform average light distribution for areas of said lens positioned at various distances with respect to said light source; and
    a light guiding cavity, said light guiding cavity includes a plurality of convex lens sections interleaved with a plurality of concave lens sections to distribute light originating from said light source toward vertices of said lens.

2. The lens according to claim 1, wherein
    said light guiding region is formed as a surface of said light guiding cavity that is shaped to focus light from said light source positioned within said light guiding cavity toward said periphery of said lens.

3. The lens according to claim 1, wherein said lens has a polygonal shape.

4. The lens according to claim 1, wherein said lens has a polygonal shape, wherein said concave lens sections face mid-sides of said polygonal lens, said concave lens sections diverting light away from said mid-sides of said polygonal lens, and wherein said convex lens sections face vertices of said polygonal lens, said convex lens sections focusing light from said light source towards said vertices of said polygonal lens.

5. The lens according to claim 1, wherein a top of said light guiding cavity comprises a concave lens segment which spreads light from said light source sideways, away from a center axis of said light guiding cavity.

6. The lens according to claim 1, wherein said light source is a light emitting diode.

7. The lens according to claim 1, wherein said transmission channels each have a width, which increases as a function of distance from said light source.

8. The lens according to claim 7, wherein a corner channel width of each transmission channel is larger than a mid-side channel width of said each transmission channel.

9. The lens according to claim 1, wherein said transmission channels are formed as slanted regions on said lens surface.

10. The lens according to claim 1, wherein said reflection regions are formed as mirror areas alternating with said transmission channels.

11. The lens according to claim 1, wherein said lens has a polygonal shape, and said lens has a plurality of light guiding regions at vertices of said polygonal shape, said vertices having a thickness greater than a thickness at mid-sides of said lens.

12. An LCD backlight, comprising:
a plurality of lenses arranged in a pattern, each of said lenses including:
a light guiding region, said light guiding region being shaped to direct light from a light source toward a region of said lens located on the periphery of said lens; and
a lens surface, said lens surface having reflection regions for reflecting light from said light source back into said lens and transmission channels for transmitting light from said light source outside said lens, a characteristic of said transmission channels varying as a function of the distance from the location of said light source so as to create substantially uniform average light distribution for areas of said lens positioned at various distances with respect to said light source, and
a light guiding cavity, wherein said light guiding cavity includes a plurality of convex lens sections interleaved with a plurality of concave lens sections light originating from said light source toward vertices of said lens.

13. The LCD backlight according to claim 12, wherein said plurality of lenses each have a polygonal shape and are arranged in a tessellated pattern.

14. The LCD backlight according to claim 12, wherein said light guiding region is being formed as a surface of said light guiding cavity that is shaped to focus light from said light source positioned within said light guiding cavity toward the entirety of said periphery of said lens and arriving at a uniform intensity.

15. The LCD backlight according to claim 14, wherein each lens has a polygonal shape.

16. The LCD backlight according to claim 14, wherein a top of said light guiding cavity comprises a concave lens segment which spreads light from said light source sideways, away from a center axis of said light guiding cavity.

17. The LCD backlight according to claim 12, wherein said transmission channels each have a width, which increases as a function of distance from said light source.

\* \* \* \* \*